United States Patent [19]

Takamatsu et al.

[11] Patent Number: 5,040,873

[45] Date of Patent: Aug. 20, 1991

[54] OPTICAL DEVICE

[75] Inventors: Yoshihiro Takamatsu, Uji; Kouhei Tomita, Takatsuki; Junichi Takagi, Yawata, all of Japan

[73] Assignee: Omron Corporation, Kyoto, Japan

[21] Appl. No.: 634,829

[22] Filed: Jan. 2, 1991

Related U.S. Application Data

[63] Continuation of Ser. No. 515,506, Apr. 27, 1990, abandoned.

[30] Foreign Application Priority Data

May 12, 1989 [JP] Japan .................................. 1-119977

[51] Int. Cl.$^5$ ................................................ G02B 7/02
[52] U.S. Cl. .................................... 359/808; 359/819
[58] Field of Search ............... 350/252, 253, 251, 255, 350/242, 245, 237, 96.18, 96.20, 96.28, 321; 248/309.1, 316.6, 316.8

[56] References Cited

U.S. PATENT DOCUMENTS

| | | | |
|---|---|---|---|
| 3,652,152 | 3/1972 | Thursby, Jr. ...................... | 350/252 |
| 4,704,001 | 11/1987 | Parandes ............................ | 350/242 |
| 4,767,171 | 8/1988 | Keil et al. ........................ | 350/96.18 |
| 4,927,237 | 5/1990 | Hart .................................. | 350/252 |

FOREIGN PATENT DOCUMENTS

| | | |
|---|---|---|
| 60-8812 | 1/1985 | Japan . |
| 61-279814 | 12/1986 | Japan . |
| 62-119509 | 5/1987 | Japan . |
| 62-125307 | 6/1987 | Japan . |

Primary Examiner—Paul M. Dzierzynski
Assistant Examiner—Loha Ben
Attorney, Agent, or Firm—Dickstein, Shapiro & Morin

[57] ABSTRACT

An optical device is fitted into a casing (2) in a state in which a pair of lenses (6, 8) have the same optic axis (Ra). The casing (2) includes two identically shaped casing halves (1A, 1B), with the pair of lenses (6, 8) being embraced and held by the two casing halves in a state in which a gap (S) is left between the surfaces of the two casing halves.

12 Claims, 6 Drawing Sheets

OPTICAL DEVICE

This application is a continuation of U.S. application Ser. No. 07/515,506, filed Apr. 27, 1990, now abandoned.

BACKGROUND OF THE INVENTION

1. Field of the Invention

This invention relates to improvements in a structure for holding lenses in an optical device.

2. Description of the Related Art

FIG. 5 is a sectional view illustrating the internal construction of an optical displacement detector. The detector includes a casing 20 within which are provided a light-emitting diode 21 serving as a light source, a pair of ball lenses 22, 23, a half-mirror 24, a photodiode 25 for monitoring purposes, and a photodiode 26 for producing a signal. Also provided within the casing 20 are actuators 30 capable of being freely advanced and retracted in a direction orthogonal to the optic axis of this optical system. The actuator 30 is biased outwardly at all times by a spring and is held at its outermost position by a stopper. A bellows is provided on the outwardly projecting exterior of the actuator 30. The inner end of the actuator 30 is formed into a knife edge.

When the actuator 30 is inwardly displaced as a result of being pushed by an object, the knife edge cuts off part or all of the light directed from the ball lens 23 to the photodiode 26. As a result, the level of the output signal from the photodiode 26 changes. Thus, there is obtained a signal representing the amount of displacement of the actuator 30, namely a signal representing the amount of movement of the object acting upon the actuator, the external shape of the object, etc.

The light-emitting diode 21, ball lenses 22, 23, half-mirror 24 and monitoring photodiode 25 constituting the internal elements of the detector are actually fitted into an internal casing 40 and are integrated to form an optical device.

A problem encountered in the prior art is that the optic axes of the elements in the abovementioned optical device cannot be aligned accurately.

Specifically, FIG. 6 illustrates, in simplified form, the arrangement of the two ball lenses 22, 23 in the internal casing 40 as seen from the side thereof. In order to clarify the problem with the prior art, the shape of the internal casing 40 is simplified in comparison with that shown in FIG. 5. The internal casing 40 comprises a base portion 41 to which each element is attached, and a cover portion 42 provided on the base portion 41. The base portion 41 is provided with a groove 43, and the two ball lenses 22, 23 are fitted in the groove 43 at predetermined positions and are fixed to the groove by a bonding agent.

Accordingly, in a case where the groove 43 is formed to the same depth in a regular shape, an optic axis Ra connecting the centers of the two ball lenses 22, 23 is situated in a horizontal attitude. However, if the groove 43 is formed to have an incline at the time of manufacture, as indicated by the two-dot chain lines, one ball lens 22 will be lower than the other and the optic axis Rb will assume an inclined state. When the optic axis of the ball lenses 22, 23 is skewed in this manner, the light from the light-emitting diode 21 does not reach the photodiode 26 in a normal state and the monitoring operation performed by the photodiode 25 also does not take place normally.

SUMMARY OF THE INVENTION

An object of the present invention is to provide an optical device in which the optic axis of a pair of lenses can be positioned accurately in a set direction with facility.

According to the present invention, the foregoing object is attained by providing an optical device fitted into a casing in a state where a pair of lenses have identical optic axes, characterized in that the casing comprises two identically shaped casing halves, with the pair of lenses being embraced and held by the two casing halves in a state in which a gap is left between the surfaces of the two casing halves.

In accordance with the construction of the invention, the optic axes can be situated at set positions even if the two casing halves constituting the casing include a dimensional error due to manufacture, as a result of which the positions at which the lenses are mounted in the casing halves become offset. Specifically, since the amounts of positional offset of the lenses from the two casing halves are the same when the device has been assembled, the optic axis is situated at a set position in the casing, which position is located at the center of the two casing halves.

Thus, in accordance with the present invention, the amount of positional offset sustained by the two lenses owing to the respective casing halves becomes the same when the casing halves are assembled to form the casing. As a result, the optic axis of each lens is situated at a set position in the casing, this position being at the center of the two casing halves. Accordingly, the optic axis of the pair of lenses can readily be set at a predetermined position in the casing at all times without being influenced by the molding precision of the casing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 through 4 relate to an embodiment of the present invention, in which:

FIG. 1 is an exploded schematic view showing the components of an optical device, in which a portion of the device is shown in section;

FIG. 2 is a plan view showing the arrangement of various elements in one casing half;

FIG. 3 is a side view showing the manner in which component parts are accommodated as seen from an end face of the casing halves; and FIG. 4 is a simplified structural view for describing the arrangement of ball lenses;

DESCRIPTION OF THE PREFERRED EMBODIMENT

Figure 1:
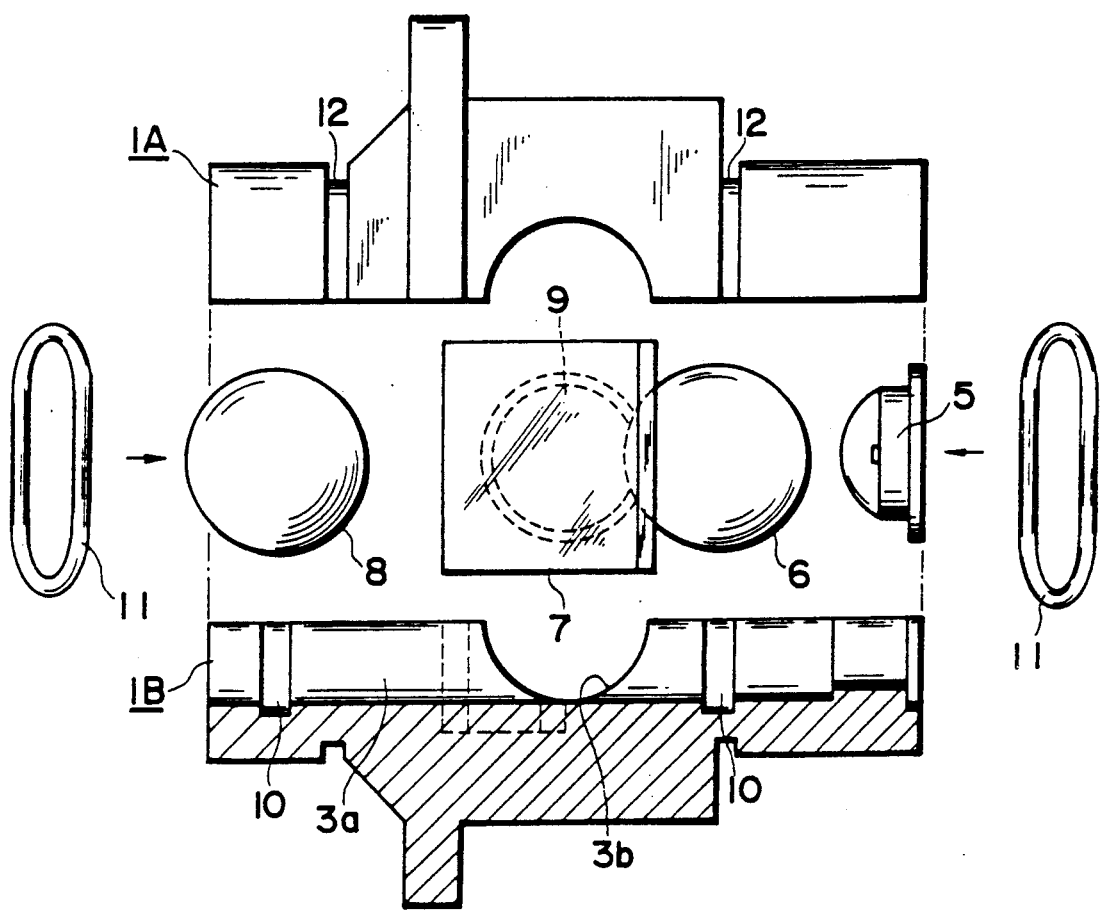

The present invention will now be described in detail based on an embodiment shown in the drawings. FIG. 1 is an exploded schematic view showing the components of an optical device using within the above described optical displacement detector.

As shown in FIG. 1, a casing 2 is split into two halves 1A, 1B. The casing halves constituting the casing 2 have the same shape obtained by being molded using the same mold.

Figure 2:
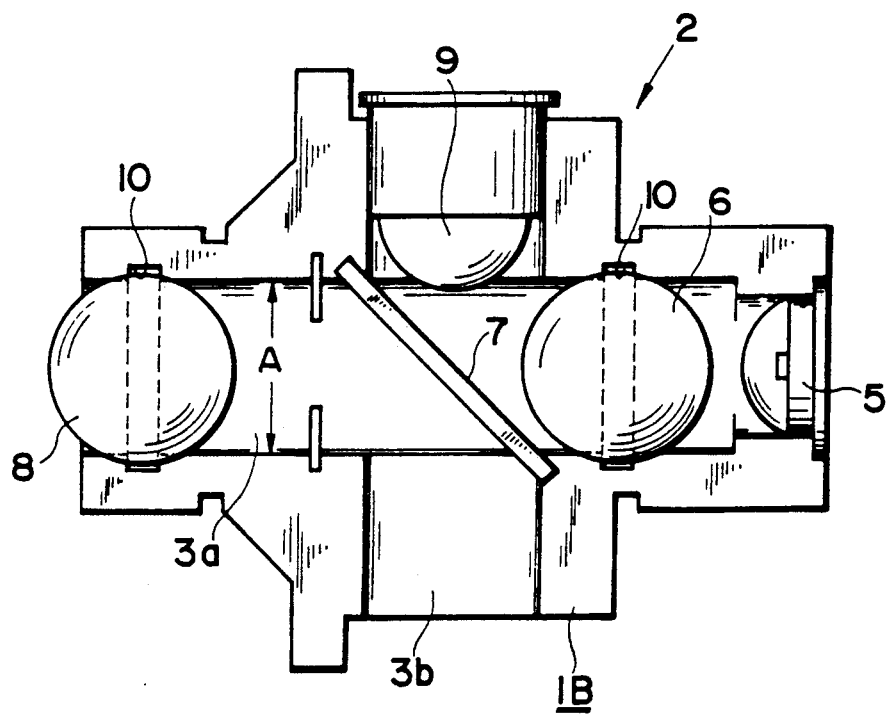

As shown in the plan view of FIG. 2, mutually opposing inner surfaces of the casing halves 1A, 1B are provided with perpendicularly intersecting grooves 3a, 3b, the former of which extends in the longitudinal direction. Fitted successively into the groove 3a from one end thereof are a light-emitting diode 5, a ball lens 6, a half-mirror 7 and a ball lens 8. A monitoring photodiode 9 is provided in the other groove 3b at one end thereof.

Figure 3:
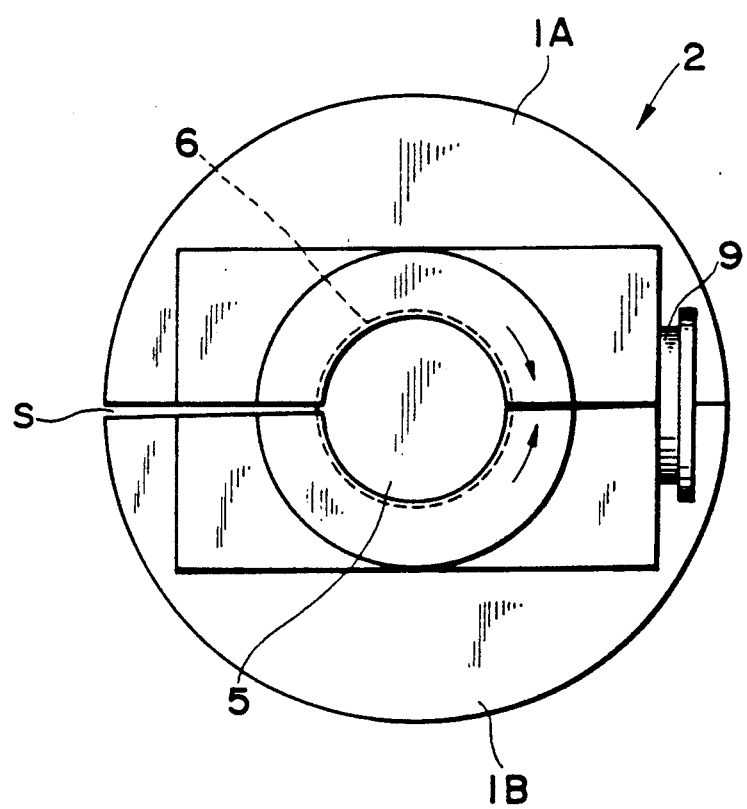

The groove 3a has a width A designed to be smaller than the diameter of the ball lenses 6, 8. As a result, the ball lenses 6, 8 will not fit entirely into the grooves 3a of the casing halves 1A, 1B, and therefore a gap S is formed between the casing halves 1A, 1B, as shown in FIG. 3, when these bodies are integrated into a whole. Numeral 10 denotes a ball lens positioning groove in each of the casing halves 1A, 1B.

The gap S is not formed on both sides of the casing 2 but on one side only, with the casing halves 1A, 1B turning in the direction of the arrow about the centers of the two ball lenses 6, 8 so that the edges on one side thereof come into contact. In this state two rubber bands 11 (FIG. 1) are engaged with tightening grooves 12 formed in the outer periphery of the casing halves 1A, 1B to tightly fasten the casing halves together, whereby the two casing halves 1A, 1B are fixed to form a unitary body to complete the assembly of the optical device. The monitoring photodiode 9 is embraced and held in the grooves 3b between the casing halves 1A, 1B on the side thereof where the casing halves contact each other.

Figure 4:
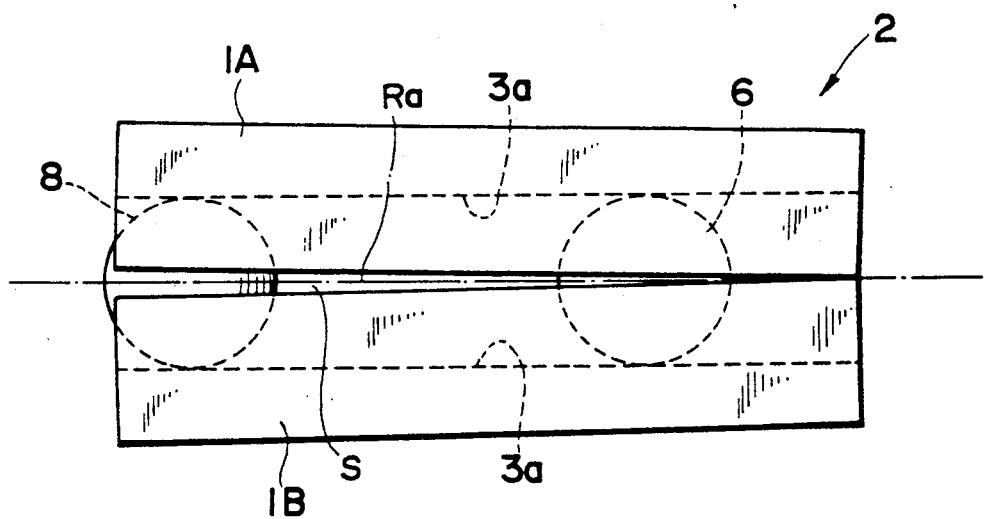
Figure 5:
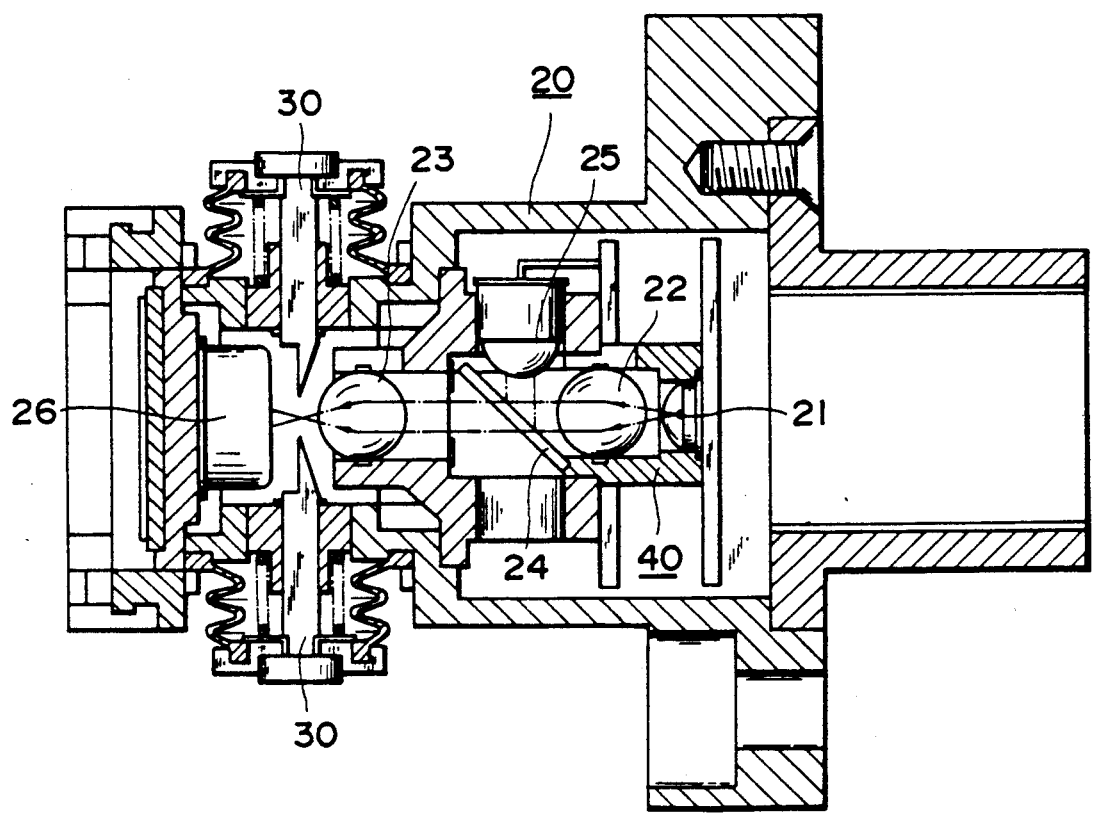
FIG. 5 is a sectional view showing an example of an optical displacement detector according to the prior art.
Figure 6:
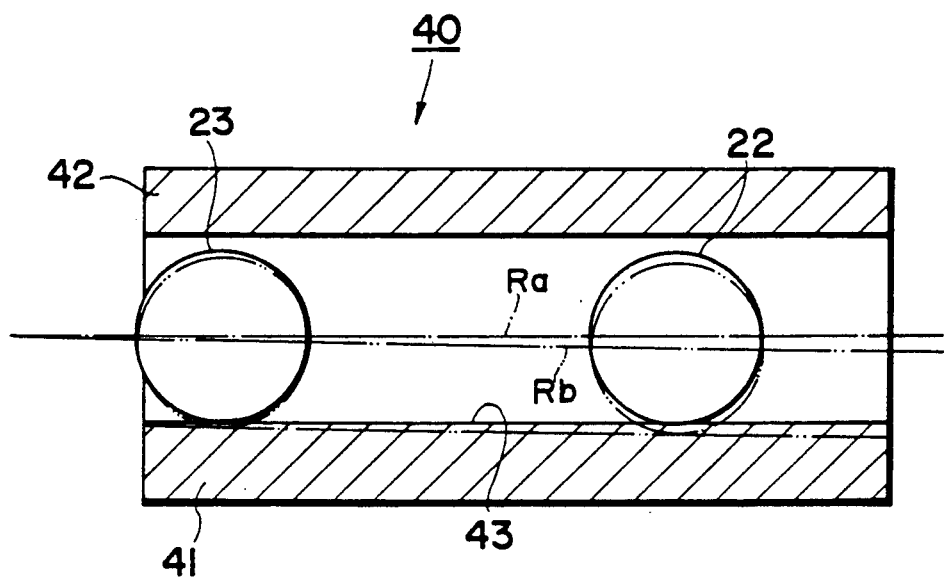
FIG. 6 is a simplified structure view for describing the arrangement of ball lenses in the prior art.

FIG. 4 shows the ball lenses 6, 8 in the mounted state in a case where the grooves 3a of the casing halves 1A, 1B are inclined owing to a molding error.

In this case, the mounted heights of the respective ball lenses 6, 8 in the casing half 1A of one side are such that the ball lens 6 is comparatively deep while the other ball lens 8 is comparatively shallow in accordance with the height of the bottom surface of the groove 3a. However, since these mounting positions are similar in the casing half 1B of the other side, the optic axis Ra connecting the centers of the two ball lenses 6, 8 always coincides with the horizontal set optic axis in the casing 2 constructed by uniting the two casing halves 1A, 1B. As a result, the optic axis Ra of the ball lenses is situated at the proper position with respect to the light-emitting diode 5, monitoring photodiode 9 and signal-producing photodiode.

As many apparently widely different embodiments of the present invention can be made without departing from the spirit and scope thereof, it is to be understood that the invention is not limited to the specific embodiments thereof except as defined in the appended claims.

What is claimed is:

1. An optical device comprising:
   a casing having two halves and two sides with substantially identical inner surfaces; and
   a pair of lenses fitted into said casing in a state in which said pair of lenses have identical optic axes;
   said pair of lenses being embraced and held by said two casing halves in a state in which a gap is left on one side of said casing between opposing surfaces of said two casing halves.

2. The optical device of claim 1, wherein said casing is split into said two casing halves in the direction of said optic axes of said lenses.

3. The optical device of claim 1, wherein said casing halves are respectively provided with grooves into which said lenses are fitted.

4. The optical device of claim 3, wherein each groove has a width that is smaller than the diameters of said lenses causing said gap to be formed between said casing halves.

5. The optical device of claim 1, wherein said casing halves are respectively provided with lens positioning grooves.

6. The optical device of claim 1, further comprising fastening means for fastening said casing halves together such that said halves are substantially tightly fastened.

7. The optical device of claim 6, wherein said fastening means are sufficiently flexible such that errors formed into one of said casing halves allows said gap between said opposed halves to be formed while said halves remain tightly fastened.

8. The optical device of claim 1, wherein said optical device is included in an optical displacement detector.

9. The optical device of claim 1, wherein said casing halves obtain said substantially identical inner surfaces by being molded in an identical mold.

10. The optical device of claim 1, wherein said casing is provided with perpendicularly extending grooves, wherein a first of said grooves is fitted with a light emitting diode, said lenses and a mirror and wherein a second of said grooves is fitted with a monitoring photodiode.

11. The optical device of claim 1, wherein said opposing surfaces come into contact with each other on an opposite side from said gap.

12. The optical device of claim 1, wherein said gap compensates for errors in one of said casing halves such that said optic axes between the centers of said lenses are always maintained in an aligned position in said optical device.

* * * * *